Nov. 5, 1929. G. L. PRICHARD ET AL 1,734,827
CRACKING STILL
Filed March 4, 1922 6 Sheets-Sheet 5

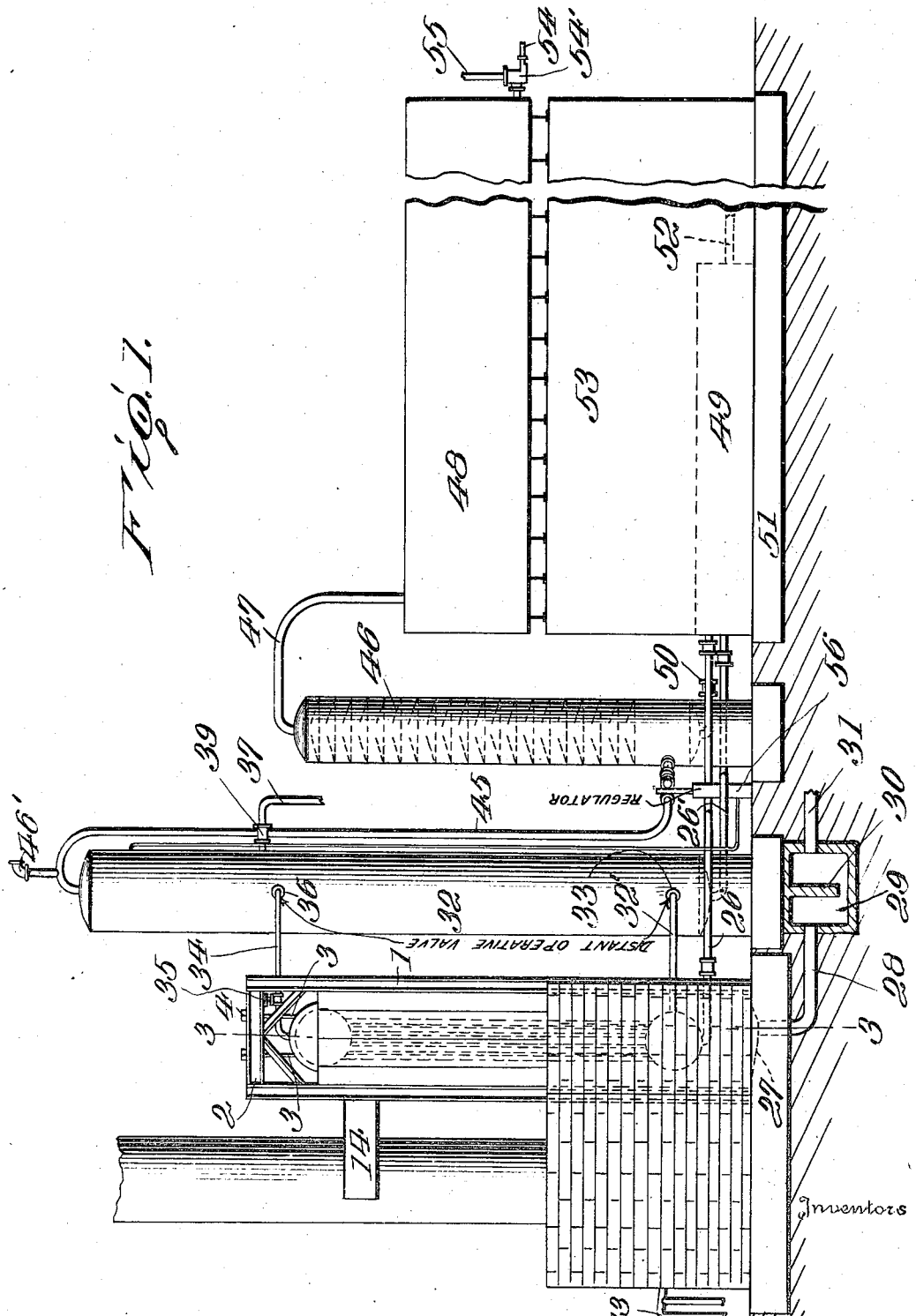

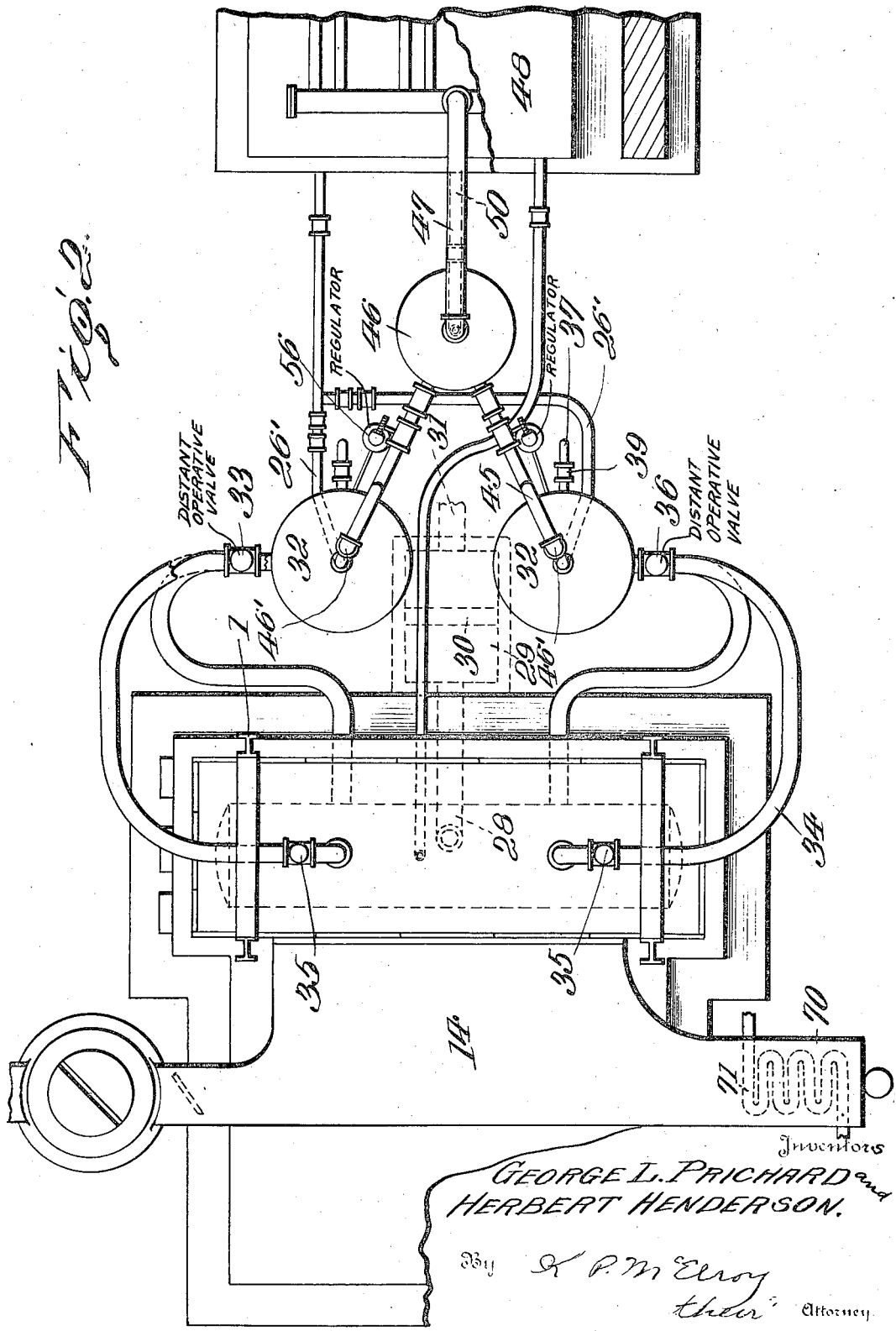

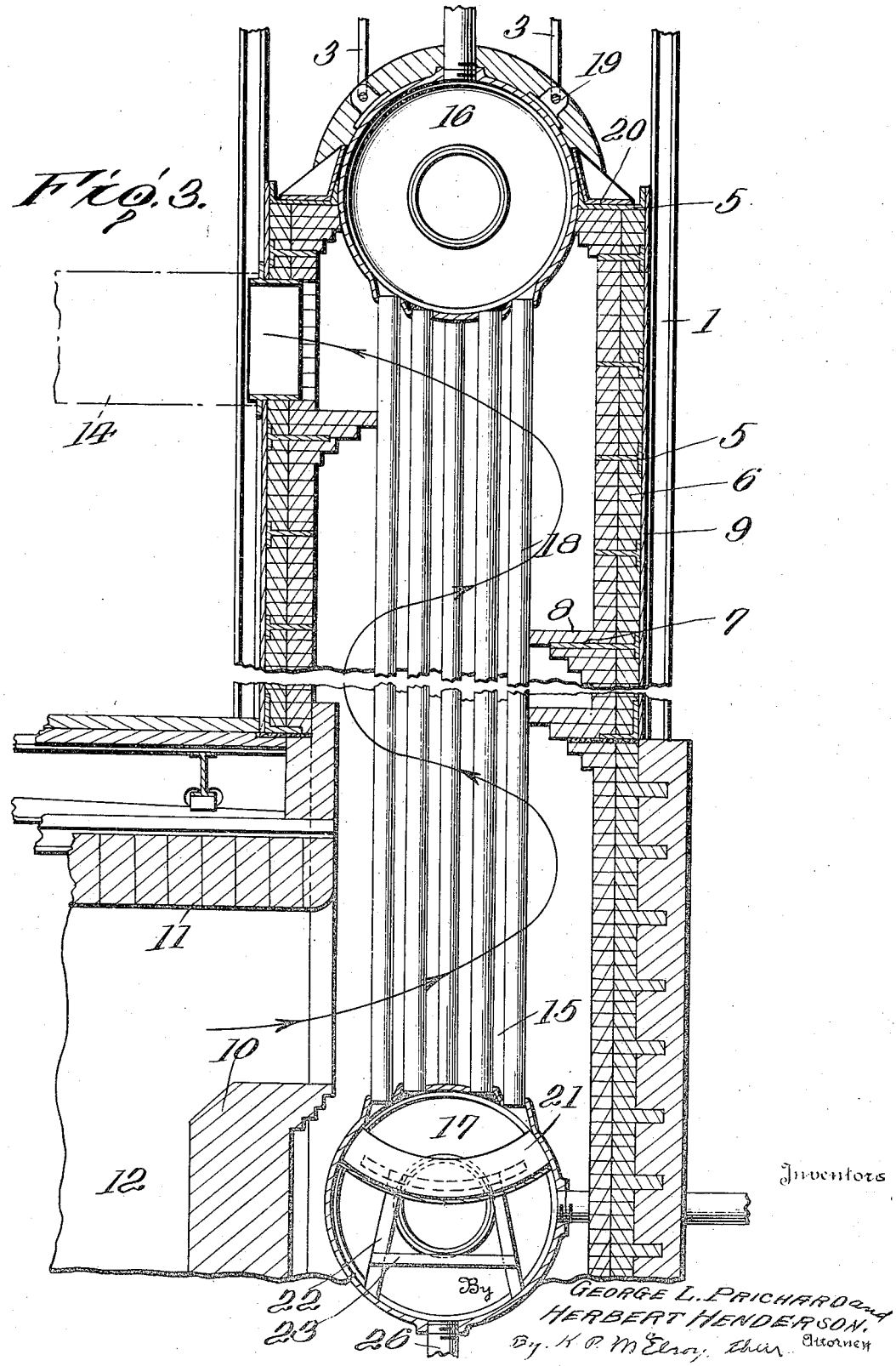

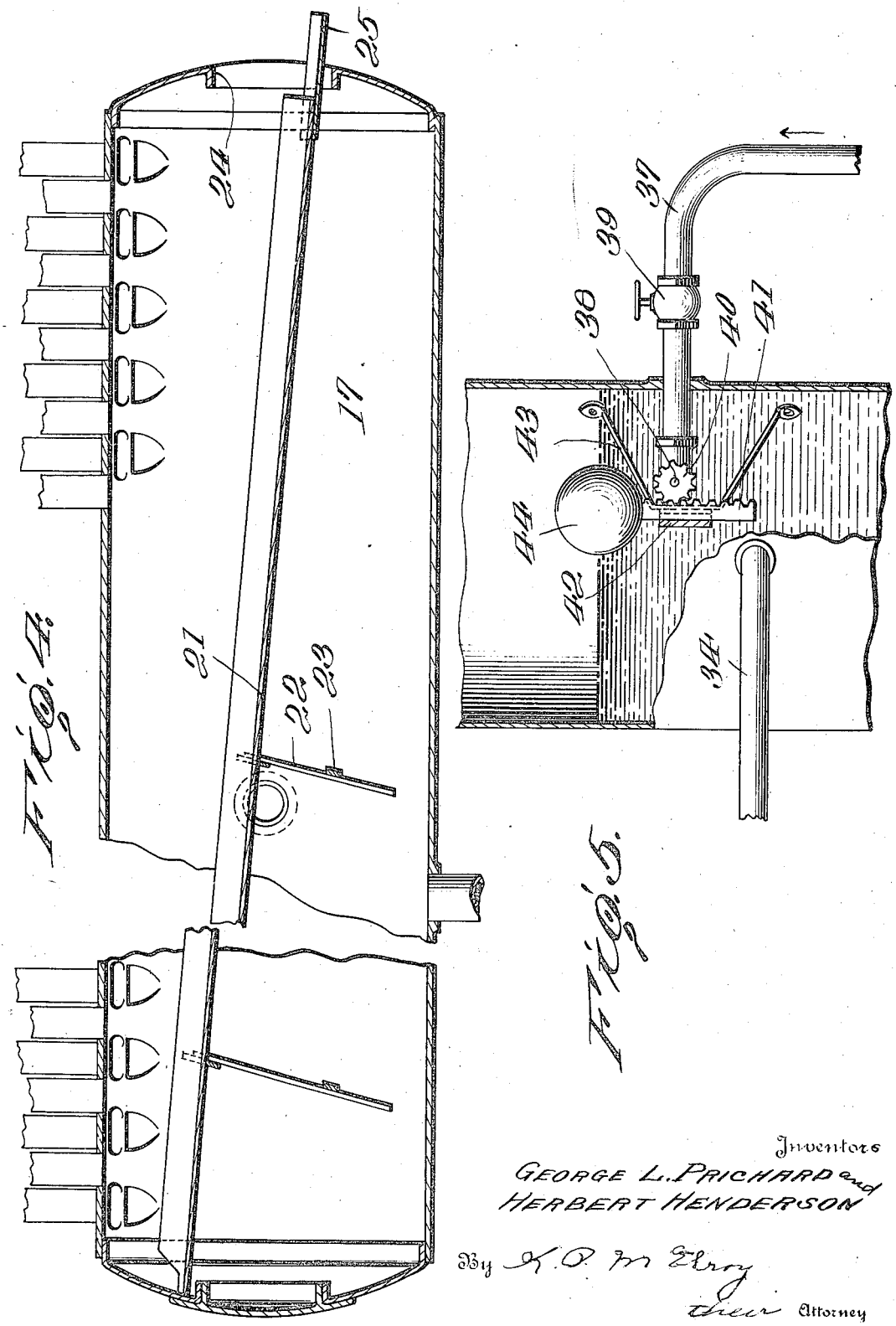

Fig. 6.

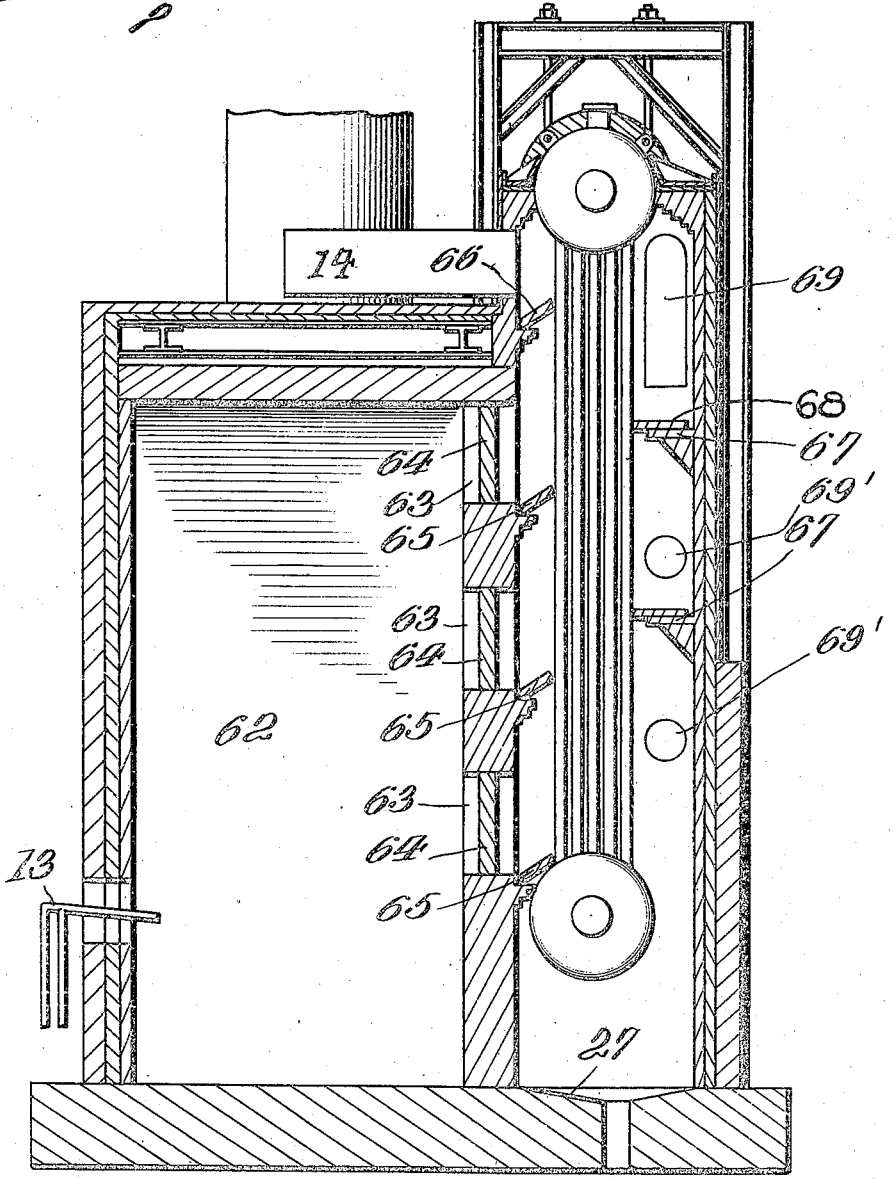

Patented Nov. 5, 1929

1,734,827

UNITED STATES PATENT OFFICE

GEORGE L. PRICHARD AND HERBERT HENDERSON, OF PORT ARTHUR, TEXAS, ASSIGNORS TO GULF REFINING COMPANY, OF PITTSBURGH, PENNSYLVANIA, A CORPORATION OF TEXAS

CRACKING STILL

Application filed March 4, 1922. Serial No. 541,126.

This invention relates to cracking stills; and it comprises a cracking still having a comparatively large hot oil chamber, lateral heated vertical boiling and circulating tubes connected with said oil chamber at their top and bottom, a dephlegmator receiving vapors from said hot oil chamber, and condensing means receiving vapors from the dephlegmator; all as more fully hereinafter set forth and as claimed.

In a general way it may be said that cracking with production of low boiling oils results whenever a petroleum oil is heated above a certain temperature, often arbitrarily set as being about 750° F. Oils may be cracked in either a liquid or a vapor form; but in the former case, if the temperature selected is above the normal boiling point, pressure must be used. Many methods and apparatus embodying these principles have been proposed and several are in use.

It is the purpose of the present invention to provide a simple and effective apparatus, economical of heat and capable of being run for a long period of time without the necessity of being cleaned out. In cracking oils there is always a production of carbon and this carbon tends to deposit on the heating surfaces, impeding further transmission of heat and producing various other inconveniences (buckling of plates, etc.). For this reason cracking stills, as a rule, are not economical as regards heating.

In the present invention, heating is performed in a special heating element consisting of vertical tubes in a suitable fire chamber; a plurality of tubes being mounted in parallel and connected to suitable drums or headers at the top and bottom. The whole arrangement is suspended in a fire chamber to prevent the injurious effects of expansion and contraction and the oil is substantially uniformly heated throughout the tubes. The two headers are connected laterally to one or more vertical surge chambers, or hot oil chambers, of comparatively large capacity. The top header connects with a surge chamber at a point somewhat below the normal oil level therein. With this arrangement a very active upward circulation is created in the heating tubes; the oil flowing in cyclic circulation, from and to the surge chamber, through the heating tubes. The tubes form the hot leg, the surge chamber the cold leg of the circulating system. In the heating tubes, the boiling of the oil creates a mixture of liquid and vapor passing violently upward and giving little opportunity for deposition of carbon on the walls, while with the rapid passage of liquid and vapor along the tube walls, the heating efficiency of the tubes becomes very great. The mixture of oil and vapor passes into the surge chamber below the normal level therein and gives up its heat in large part to the oil. When the apparatus is in operation, the temperature of the body of oil in the surge chamber is raised to such a point as will vaporize naphtha and allow its vapors to pass forward, while effectively condensing heavier oils. Such low boiling oil as may be in the oil supplied to the surge chamber is volatilized and passes forward with the low boiling oils formed in cracking. As will be noted, with this arrangement the surge chamber is at once a heat exchanger, a stripping or topping device for the oil entering the system, and a fractional condenser holding back the heavy oils. The whole system may operate under as much pressure as may be desired.

The vapors passing off from the surge chamber are led through a dephlegmator and thence to water-cooled condensers in the usual way.

In the accompanying drawings we have shown two forms of apparatus useful in the performance of our process and within the purview of our invention.

In these drawings, Fig. 1 is a side elevation with parts in section and constituting more or less a diagrammatical showing of the equipment for performing the process;

Fig. 2 is a top plan view of Fig. 1, certain parts being shown in section;

Fig. 3 is a vertical section along line 3—3 of Fig. 1 on an enlarged scale;

Fig. 4 is a detailed longitudinal section of a lower drum of the still of Fig. 1;

Fig. 5 is an enlarged section partly in elevation showing the valve in the surge tank;

Fig. 6 is a side elevation of a slightly different form of apparatus than that shown in Fig. 1; and Fig. 7 is a vertical section through the furnace, showing the means for controlling the fire gases.

The still is specially designed and comprises the supports 1 bridged as at 2 and having the rods 3 secured to the bridge by means of the bolts 4. This supporting superstructure is preferably of angle iron construction. The upper part of the brick casing 6 above the fire box and around the heating element is hung to the drum 16 by lugs 20 riveted to the drum, and by upper channel irons 5 bolted to the bottom of these lugs. The upper and lower brick supporting lugs 5 and 7 are bolted to the boiler plate 9. The whole boiler-like arrangement together with the upper brick work 6 is thus suspended from the standards 1, and expansion and contraction well taken care of. Asbestos packing may be used between the upper part of the fire box and the suspended brick work 6. Certain of these firebrick supporting angle irons, such as 7, are longer than others to support layers of the bricks, as at 8, in order to form baffles inside the furnace. The structure described, together with the bridge wall 10, the suspended flat arch 11 and the furnace 12, constitutes the entire heating device for the still to be described. The furnace may be fired by an oil or other burner, diagrammatically shown at 13. The flue 14 leads to the stack.

Mounted in the heating device is the still 15. This still comprises the upper and lower drums 16 and 17, respectively, joined by the tubes 18. The upper drum or head 16 is provided with a plurality of ears 19 to which the rods 3 are secured. This construction results in the provision of a still suspended in the heating device. To assist in supporting the brick, the angle irons and braces 20 resting on the top angle irons 5 may be used. The upper and lower drums or still heads are in communication through the tubes 18. The lower head is provided interiorly with carbon or tar shelf 21 (clearly shown in Fig. 4). This shelf 21 may be suspended or supported in the drum. It is shown supported by the legs 22 suitably braced by rods 23. This shelf, being directly under the tubes 18, receives the carbon and heavy tar which is cleaned from these tubes by the use of the usual boiler tube cleaning devices. When this cleaning is done, the manhole cover may be removed from the end 24 and the auxiliary shelf 25 may be placed in position to form a continuation of the shelf 21, so that tar and carbon and heavy residue collected and deposited upon the shelf 21 may be scraped out of the lower still head. Line 26 may lead from the bottom of the lower still head for conducting heavy liquid material to the cooling box hereinafter described.

In operation, should any of the tubes leak or for any reason break, the bottom floor 27 of the furnace is provided with the drawoff line 28 leading to the trap 29, with the bridge wall 30 for preventing admission of air and gases and thence from said trap through pipe 31 to the sewer. The trap 29 is a fire trap.

In communication with the still is the surge tower 32 (one or more may be used) having the pipe 32' in communication with the lower still head 17 through the hydraulic valve 33, and leading from the top of the upper still head 16 is the vapor line 34 provided with the safety valve 35 and having hydraulic gate valve 36.

The surge tower 32 is provided with a charge line 37 which terminates inside the tower in a valve 38. The line may have a hand valve 39 outside the tower. The inside valve 38 is provided with a gear 40 (see Fig. 5) and this gear is adapted to mesh with a sliding rack 41 riding in the ring 42 which, in turn, is suitably supported inside the tank by the arms 43. At its upper end, the rack carries the float 44. The height of the oil in the surge tower 32 is determined or controlled by this float. When the float descends, it opens the valve 38 and when the float ascends, it closes such valve. The line 37 leading to the surge tower communicates with a constant pressure pump or the like, working continuously so that the oil is supplied to the surge tank immediately upon the opening of the valve 38.

Oil from the surge tank is delivered to the bottom still head 17 through pipe 32'.

Vapors from the upper still head enter the surge tower advantageously below the level of the oil therein through the line 34 and leave the surge tower through line 45 provided with a safety valve 46'. From this line the vapors (in Fig. 1) go to the dephlegmating tower 46 and from thence they flow through line 47 to the condenser box 48. Condensate from the dephlegmating tower goes to the cooling box 49 through line 50. The cooling box is mounted on a suitable foundation 51 and from it, by line 52, the condensate goes to pumps and thence to tanks not shown. The condenser box is advantageously mounted upon the foundation 53 and is provided with a line 54 leading past trap 54' to a storage tank for the condensates. The gas may go to a gas compressor (not shown) through line 55.

For the purpose of relieving the pressure to the dephlegmating tower and for controlling the pressure on the still, we provide a regulator, such as the well known Mason regulator, on the line 45 leading from the surge tower 32 to the dephlegmating tower 46, this regulator having an independent pipe connection to a point in the vapor space of the surge tower. This regulator is shown diagrammatically at 56, the regulator itself being no part of the invention, it being a device which may be found on the market. In other words, the pressure of the vapors going to the dephlegmator is controlled by this regulator, which is governed by the pressure in the surge tower.

In Fig. 6 is shown in elevation a modified form of apparatus. This closely resembles the apparatus previously described, and its operation is the same. However, in Fig. 6, we have shown the dephlegmator 46 at a higher elevation than the surge tower 32, such dephlegmator being mounted on the supports 60 and provided with reflux or backtrapping line 61 leading to the surge tower. In this view we may use a Mason regulator for the vapor line 47 leading from the dephlegmator.

In Fig. 7, we have shown a modified form of furnace. In cracking oils, it is highly desirable that there should be a uniform temperature through the body of oil undergoing cracking. To accomplish this purpose, we have provided our furnace shown in Fig. 7 with the tall fire box 62 having a plurality of vertically spaced flues 63 provided with sliding dampers 64. Immediately below each flue 63 is located the baffle plate 65, and an additional baffle plate 66 is located towards the top of the furnace chamber, these baffles causing circulation around the tubes. On the opposite side of these baffles, the furnace chamber is provided with a series of shelves 67 holding the baffle plates 68. By a proper adjustment of the sliding valves 64 the fire gases can be sent to any point along the height of the tubes and if there is local overheating at any point along the tubes, the fire gases can be shut off at such point. The furnace may be provided with door 69 for removal of tubes, etc. and with the peep holes 69' for observation of temperature by color.

In ordinary boiler heating, the purpose is to supply the products of combustion or heating gases at a relatively high temperature and to absorb as many heat units as posisble, exhausting the gases at as low a temperature as possible. According to our invention, in cracking oil the fire gases are supplied at the cracking temperature throughout the whole length of the heating surface and, therefore, are not reduced in temperature in the same ratio as gases used for heating boilers. According to our invention, these hot gases, before reaching the stack through flue 14, may be sent to the superheater or preheater 70, in which may be located coils 71 leading to the supply line for the cracking furnace.

Higher boiling hydrocarbons, such as gas oil and the like, to be cracked are delivered under pump pressure to the surge tower 32 by line 37, valve 39 being open. When the float 44 in the surge tower reached a predetermined height, the rack attached thereto operates the pinion 40, closing the valve 38. When the float descends, the valve is opened. This provides automatic control of oil to the surge tower. There should be sufficient vapor space above the normal oil level in the surge tower.

The oil from the surge tower passes by line 32' to the lower drum 17 and from such drum up past the furnace gases while confined in the plurality of tubes 18. The oil is heated to a cracking temperature which may be from 650° F. to 1400° F. or 1500° F., or higher, and then passes to the drum 16, mostly as vapor. From the drum 16, the vapors pass to the surge tower 32 through vapor line 34 which is located below the normal level of the oil in the surge tower. As is illustrated in Fig. 2, two surge towers may be used. The waste gases pass through flue 14 to the stack. When the form shown in Fig. 7 is used, the gases are controlled so as to secure even heating along the length of the tube by a proper manipulation of the slide valves 64. The gases may pass to the superheater 70 wherein are located the coils 71. These coils may be connected with the source of supply of oil and may lead to the line 37 of the surge tower. In case the tubes, or one of them, should break, the hydraulic gate valves 33 and 36 are immediately closed and only the oil in the tube heater is lost from the system. This oil may be caught in the basin immediately below the lower drum and sent by line 28 to the trap 29 and thence to a point of use or to the sewer through line 31. The valves 33 and 36 prevent loss of oil from the surge tower. The trap 29 is provided with the downwardly projecting plate 30 which will prevent passage of flame in event of fire in the furnace proper.

The surge towers 32 are provided with safety valves 46' and the vapor lines 45 leading to dephlegmator 46. In order that the pressure or the velocity of the vapors to the dephlegmator 46 may be controlled, they are admitted to the dephlegmator through a valve regulated by a Mason regulator or similar type of device 56. This regulator is provided with a stem operating the valve to the dephlegmator, such stem being controlled by a piston in a cylinder and the piston being moved by the pressure of the vapors in the line 45 or in the surge tower 32. This regulator may be set so that the vapors enter the dephlegmator at a predetermined rate, velocity or pressure. This is particularly advantageous because the uniform operation or function of a dephlegmator is easily disturbed by fluctuations in the amount or pressure of the vapors entering it. Vapors from the dephlegmator leave by line 47 and go to the final or water cooled condenser 48. The lower boiling hydrocarbons condensed flow past the trap 54' by line 54 to stock storage tanks (not shown). Uncondensed gases pass through line 55 to the burners or to other points of use. Sludge and heavy residues from the dephlegmator pass to the cooling box 49 through line 50. When the still is shut down and it is desired to remove the oil or when it is desired to remove heavy residue such as tar or sludge from the still the valve on line 26 may be opened and such tar sent to coils in the cooler 49, the gate valve 35 on line 34 being closed. The residue or sludge in the surge towers settling to the bottom is removed continuously or at intervals through lines 26' and sent to coils in the cooling box 49.

In Fig. 4, we have shown on an enlarged scale and in longitudinal section, the lower drum 17. When the tubes are to be cleaned, the head is taken off the end 24 of the drum and the short shelf 25 is inserted so that it forms a continuation of the shelf 21. The tubes, being directly over this shelf, the carbon falls upon the shelf when the tubes are cleaned and may be easily raked out with a hoe or the like.

In Fig. 6, the dephlegmator is at a higher elevation than the surge tanks and, if desired, the pressure may be maintained constant in the dephlegmator by means of the Mason regulator on the vapor line 47. The condensates from the dephlegmator flow by run-back line to the surge towers 32.

The mounting of the tubes and header in the furnace chamber is important in that contraction and expansion are well taken care of without damage to the firebrick, this being possible by the swinging or suspension arrangement described.

What we claim is:—

1. Apparatus for cracking oils comprising a fire box and a heating chamber in communication therewith, supports, a still comprising an upper and lower drum connected by tubes and suspended in the heating chamber by the supports, and fire brick or the like surrounding the still and suspended therewith above the level of the fire box.

2. Apparatus for cracking oils comprising a fire box and a heating chamber in communication therewith, supports, a still suspended in the heating chamber by the supports, a firebrick lining for the heating chamber attached to and suspended with the still, said lining being immediately above the fire box and baffles carried by the fire brick wall and in the heating chamber to cause circulation of fire gases around the still.

3. Apparatus for cracking oils comprising a fire box and a heating chamber in communication therewith, supports, a drum carried by said supports, tubes depending from said drum and extending through the heating chamber and a lower drum at the end of said tubes, fire brick or the like suspended from the first said drum and surrounding the upper part of the tubes and constituting the upper part of the heating chamber, said suspended fire brick being separate from the fire box.

4. Apparatus for cracking oil comprising a tubular boiler-like arrangement having upper and lower drums connected by a plurality of tubes, supports for the upper drum, means attached to the upper drum for supporting fire brick or the like, and fire brick supported from said last named means, and surrounding the upper part of the tubes and spaced away therefrom to form a heating chamber, and a fire box in communication with the heating chamber so formed.

5. Apparatus for distilling oils comprising a still, a surge tower in open communication therewith by means connected with the still and the surge tower for supplying vapors generated by the still to the surge tower and means at a lower point in the surge tower for supplying liquid oil to the still, a dephlegmator in communication with the surge tower, and means operated by the pressure in the surge tower for controlling the rate of flow of vapors therefrom to the dephlegmator.

6. Apparatus for distilling oil comprising upper and lower drums connected by a plurality of tubes, and firing means, the lower drum being provided with an interior shelf directly under the tubes for receiving carbon and the like cleaned from said tubes.

7. Apparatus for distilling oil comprising upper and lower drums connected by a plurality of tubes, and firing means, the lower drum being provided with an interior shelf directly under the tubes for receiving carbon and the like cleaned from said tubes, and an additional shelf arranged to form an extension of the shelf contained in said lower drum, and adapted to be used for raking out material deposited on the shelf in the drum from said tubes.

Signed at Port Arthur, Texas, this 28th day of February, 1922.

GEORGE L. PRICHARD.
HERBERT HENDERSON.